(12) United States Patent
Beebe

(10) Patent No.: US 8,256,645 B2
(45) Date of Patent: Sep. 4, 2012

(54) FLUID DISPENSING SYSTEM

(75) Inventor: W. Scott Beebe, Berkley, MA (US)

(73) Assignee: Fishman Corporation, Hopkinton, MA (US)

( * ) Notice: Subject to any disclaimer, the term of this patent is extended or adjusted under 35 U.S.C. 154(b) by 453 days.

(21) Appl. No.: 12/568,180

(22) Filed: Sep. 28, 2009

(65) Prior Publication Data

US 2011/0073613 A1 Mar. 31, 2011

(51) Int. Cl.
*B67D 1/00* (2006.01)
*B65D 88/54* (2006.01)
*B65D 5/72* (2006.01)

(52) U.S. Cl. ............ 222/63; 222/333; 222/571; 604/67; 604/155; 422/509; 422/522; 422/546

(58) Field of Classification Search ................. 222/1, 63, 222/333, 571; 422/509, 521, 522, 546; 604/151–155, 65–67, 890.1
See application file for complete search history.

(56) References Cited

U.S. PATENT DOCUMENTS

| | | | | |
|---|---|---|---|---|
| 3,415,419 A | * | 12/1968 | Jewett et al. | 222/333 |
| 4,452,899 A | * | 6/1984 | Alston | 436/46 |
| 4,854,324 A | * | 8/1989 | Hirschman et al. | 600/432 |
| 4,878,601 A | * | 11/1989 | Flemming et al. | 222/137 |
| 5,348,585 A | * | 9/1994 | Weston | 118/305 |
| 5,630,527 A | * | 5/1997 | Beebe et al. | 222/1 |
| 5,665,282 A | * | 9/1997 | Nakamura | 264/40.1 |
| 5,765,722 A | * | 6/1998 | Beebe et al. | 222/1 |
| 5,921,437 A | * | 7/1999 | Takachi | 222/63 |
| 5,996,854 A | * | 12/1999 | Raal | 222/309 |
| 6,050,450 A | * | 4/2000 | Gardos | 222/1 |
| 6,662,969 B2 | * | 12/2003 | Peeler et al. | 222/1 |
| 6,682,601 B1 | * | 1/2004 | Beebe | 118/679 |
| 6,739,478 B2 | * | 5/2004 | Bach et al. | 222/1 |
| 6,942,736 B2 | * | 9/2005 | Chinander et al. | 118/692 |
| 7,617,953 B2 | * | 11/2009 | Tourigny | 222/389 |
| 8,083,498 B2 | * | 12/2011 | Gonnella et al. | 417/274 |

FOREIGN PATENT DOCUMENTS

EP 1151804 A1 7/2001
WO WO 2008/048319 A1 4/2008

OTHER PUBLICATIONS

International Search Report mailed Jan. 7, 2011 in corresponding PCT application No. PTC/US2010/002587.

* cited by examiner

*Primary Examiner* — Kevin P Shaver
*Assistant Examiner* — Nicolas Weiss
(74) *Attorney, Agent, or Firm* — Brian M. Dingman; Mirick, O'Connell, Demallie & Lougee, LLP

(57) ABSTRACT

A fluid dispenser is disclosed where a backoff distance is determined and implemented to prevent leakage while dispensing sequentially an accurate, precise amount of fluid substantially independent of the fluid remaining in a syringe-type dispenser. The fluid characteristics of the fluid, e.g. viscosity, surface tension, etc. affect the backoff distance that may be determined heuristically for fluid type, amount of fluid remaining in the syringe and amount to be dispensed. Once the fluid characteristics are known, the dispensing may be accomplished automatically with a processor loading new drive and backoff steps to a motor controller.

15 Claims, 3 Drawing Sheets

FLUID DISPENSING SYSTEM

BACKGROUND OF THE INVENTION

1. Field of the Invention

The present invention is related to fluid dispensing systems and methods associated with their use. More particularly, the present invention relates to those applications of a wide range of fluids with different viscosities where preciseness and accuracy of the amount of fluid dispensed is important.

2. Background Information

Dispensing consistent, controllable, and accurate amounts of fluids of varying viscosities remains a long standing issue for manufacturers and others where an efficient, accurate and precise amount of liquid dispensed supports a high quality product.

Herein "accurate" refers to how exact is an amount dispensed, and "precise" refers to how repeatable is the amount dispensed.

Herein the term "dot" or "bead" refers to the quantity of fluid dispensed, and "fluid" refers to liquids or suspensions that react as do liquids.

In a product manufacturing environment it is important to accurately control the amount of fluid being dispensed. If, for example, too little adhesive is dispensed the assembly may not have the structural integrity of a quality product; too great a dot or bead and the excess may ooze and make unwanted contact with other areas and/or present an unsightly finished product. In addition, low viscosity fluids may leak after the dot or bead is dispensed. To control such leakage, the controller may incorporate a backoff function. In the example of a controller moving a syringe piston forward a set distance to dispense a dot or bead, the controller will then reverse or "backoff" the piston motion creating a partial vacuum to prevent the fluid from leaking.

Known fluid dispensers may include a syringe with air pressure (pneumatic) driving the syringe piston. These systems often leak and lose both air and vacuum (negative) pressure resulting in imprecise and inaccurate dots and beads.

In pneumatic dispensers backoff is accomplished by creating a vacuum behind the piston. Positive air pressure behind the piston drives the piston forward dispensing the fluid, then a vacuum, or negative air pressure, replaces the positive air pressure, thus stopping and reversing the piston motion to pull the fluid back from the needle opening, preventing leakage. Multiple valves and solenoids are used in such systems.

In mechanical systems, backoff occurs by reversing the motor a predetermined distance. A predetermined backoff distance, however, does not account for the reduction of the fluid and the increase of the air space behind the piston in the syringe, as the fluid is dispensed. It has been found that inaccurate, imprecise amounts of fluid are delivered as the syringe fluid is depleted since the predetermined distance results in a different pressure change as the air space behind the piston changes.

SUMMARY OF THE INVENTION

The present invention discloses a fluid dispensing system and method for dispensing accurate, precise dots and beads of fluids having varying viscosities from an aperture in a reservoir as it becomes depleted. For example, water, epoxies, silicones, adhesives, solder paste, prefilled cartridges, etc. may be accurately and precisely dispensed using embodiments of the present invention.

Illustratively, the dispenser may be a conventional syringe having a piston in a barrel and a needle with a distal opening. The syringe may be disposed in a fixed dispensing station or in a handheld device. The dispenser is controlled by a microprocessor-based controller that can be programmed to dispense accurate, precise volumes of fluids based on the fluid characteristics (viscosity, surface tension, etc.), syringe size, including length and inside diameter of the barrel, dispense volume, dispense rate, etc.

The term "controller" refers to a programmable processor or microprocessor computer assembly housed within the enclosure that, when programmed accordingly, determines the duration of the dispense cycle and thus the size of the dot or bead. The controller may be used to determine the path and configuration of the dot or bead pattern.

As described above the controller may be programmed to drive the piston forward to dispense a dot or bead, whereupon the controller drives the piston backward a distance to prevent leakage through the needle. In an optimum condition, after backoff, the fluid retreats to the syringe needle opening forming a meniscus. Since the viscosity and surface tension differ for different fluids, the backoff distance will be correspondingly different, other things being equal. However, it has been found that the residual fluid in the syringe also contributes to the optimum backoff distance.

For example, a full syringe may contain 10 cc, and the piston is driven by a stepping motor where 100 steps delivers a dot size of 0.05 cc. If the 0.05 cc were to be dispensed from the syringe, the net motion by the motor for each such dot would be 100 steps. The physical operation for dispensing from a full syringe with backoff may be driving the motor forward by 125 steps and then in reverse (backoff) for 25 steps. The net would be 100 steps and a precise 0.05 cc dot would have been dispensed if the fluid were exactly at the needle opening.

In preferred embodiments of the present invention the controller may drive a stepping motor or a servo motor (with appropriate shaft encoders or other position sensing devices), but other motors may be used. The motors may drive a lead screw or other such devices that transform the rotation of a motor into a linear motion. Moreover, the means to drive the piston forward and backward may be any such device where the accuracy and preciseness of the motion can be controlled as described herein. Regardless of the drive device, the computer program, when executed, drives the piston both forward and back to match the drive forward/backoff profiles described herein.

In addition, it has been found that as the contents of the syringe are depleted, the backoff distance to achieve an accurate, precise dot is typically reduced. For example, in the example just above, when only 1 cc remains in the syringe, the dispensing of the 0.05 cc dot may require that the motor drives the piston 110 steps forward and 10 steps backoff. Illustratively, the profiles of backoff distances (in motor steps) for the different fluids and dot sizes may be heuristically determined, and the drive forward/backoff profiles may be changed in a step or continuous fashion as the remainder in the syringe changes. Illustratively the backoff distance with respect to the fluid type being dispensed, the dot size and the amount of fluid in the syringe may be stored in a computer system that controls the dispensing drive. That is, the backoff may be a set amount for dispensing the first 25% of syringes volume, and then by a different amount as the next 25% is dispensed, and by a third amount as the next 25% is dispensed, and by yet a fourth amount as the last of the syringe contents are dispensed. In other applications, however, the backoff distance may be continuously changed for each succeeding dispensed amount.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
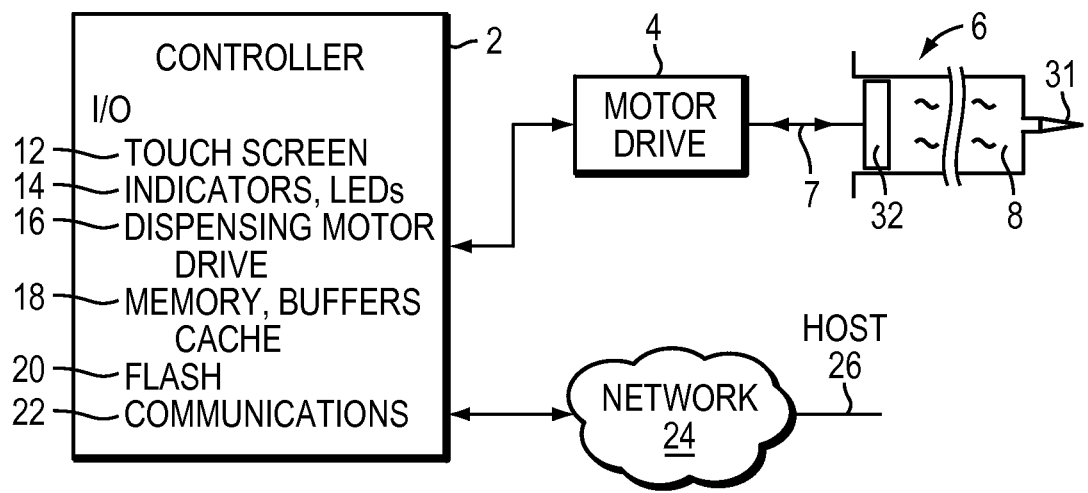
FIG. 1 is a block diagram of a fixed position dispenser.

FIG. 1 illustrates a dispensing system with a controller 2 and a dispensing unit 4 driving a syringe 6 carrying a liquid 8 for dispensing. The dispensing unit 4 may include a hand held device or a fixed device as part of a work station (not shown). The dispensing unit may include a motor, e.g., a stepping motor with accompanying electronics wherein the stepping motor may operate the syringe in both directions 7. The stepping motor typically will be controlled by an I/O (Input/Output) interface 10 in the controller 2.

Illustratively a stepping motor system is discussed herein, but an analog servo-type system with an attached or integral phase or other type distance traveled encoder may be used with the appropriate electronics in other applications.

The controller 2 may include a human interface, such as a touch screen 12 or other known connected or wireless means for inputting commands and displaying status, information, etc. For example a keypad or full keyboard may be used. Other indicators 14, e.g. LEDs, may be housed in the controller 2, along with a microprocessor or DSP (Digital Signal Processor) 16 or their equivalents, e.g., gate arrays, etc. Memory 18 may include buffers, cache and main memory containing executable code. In some applications flash memory 20 may be used. The flash memory 20 may contain the operating system software that is uploaded and executed from the main memory. In such a case the flash 20 may be removed where, as a software protection technique, no system software remains in the controller 2.

In addition, electronics 22 may be employed to communicate with a network 24. The network may be local or wide area (the Internet) so that hosts 26 may be informed of or actively monitor the status and operability of a dispensing unit, and new updated software and information may be downloaded via the network.

Figure 2A:
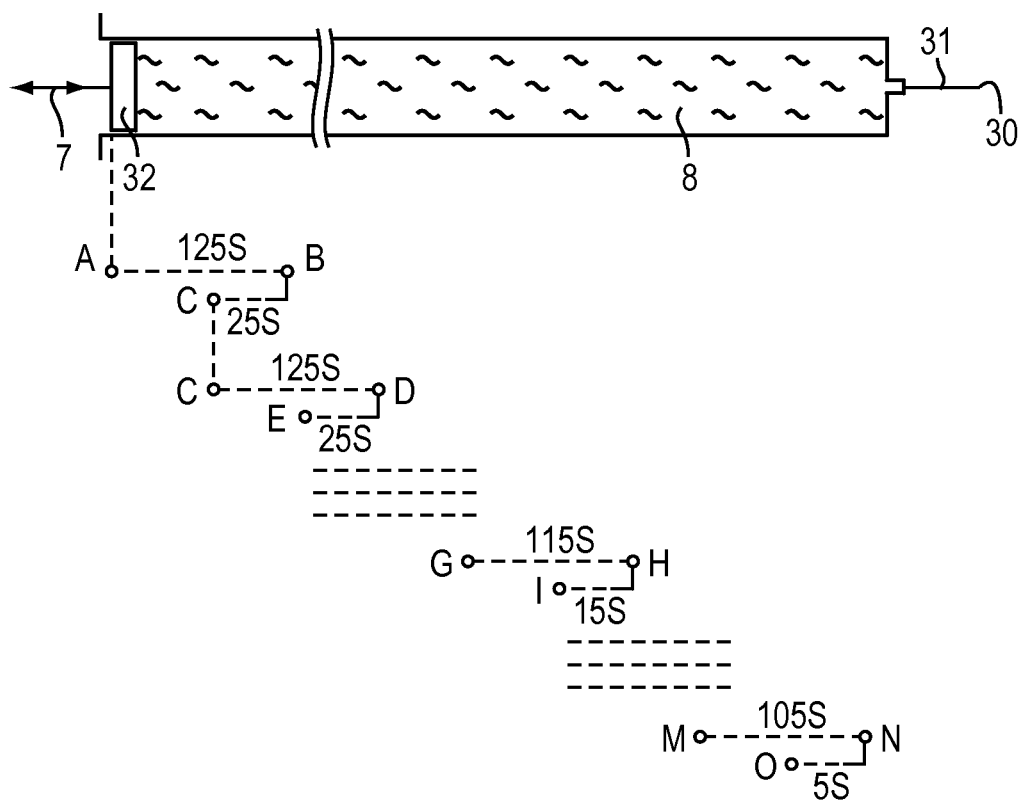
FIG. 2 is a diagram of piston positions during dispensing.

FIG. 2A illustrates an example of the pistons 32 motion as a net dot size of fluid 8 in the syringe 6 is dispensed at an aperture 30 at the end of the needle 31. For example, the net dot size may be 0.05 cc and 100 stepping motor steps may be needed to dispense the 0.05 cc. When the piston 32 is at location A, the syringe is full. The system will drive the piston 125 steps to location B and then reverse direction by 25 steps to location C. The net result is the piston moving forward 100 steps dispensing 0.05 cc's. Dispensing the next 0.05 cc drives the motor 125 steps from location C to location D and then back off 25 steps to location E. Again the net is 100 steps forward and 0.05 cc dispensed. As the contents of the syringe are depleted, the piston will be at location G. Here, when 0.05 cc's is dispensed, the piston moves 115 steps to location H and then a backoff of 15 steps to location I. Still the piston moves a net of 100 steps forward. When the piston 32 is at location M the backoff may be only 5 steps to location O—again 0.05 cc is dispensed.

The controller initially knows the number of net motor steps that will empty the syringe. So the amount of fluid remaining in the syringe is known to the controller as fluid is being dispensed.

Figure 2B:
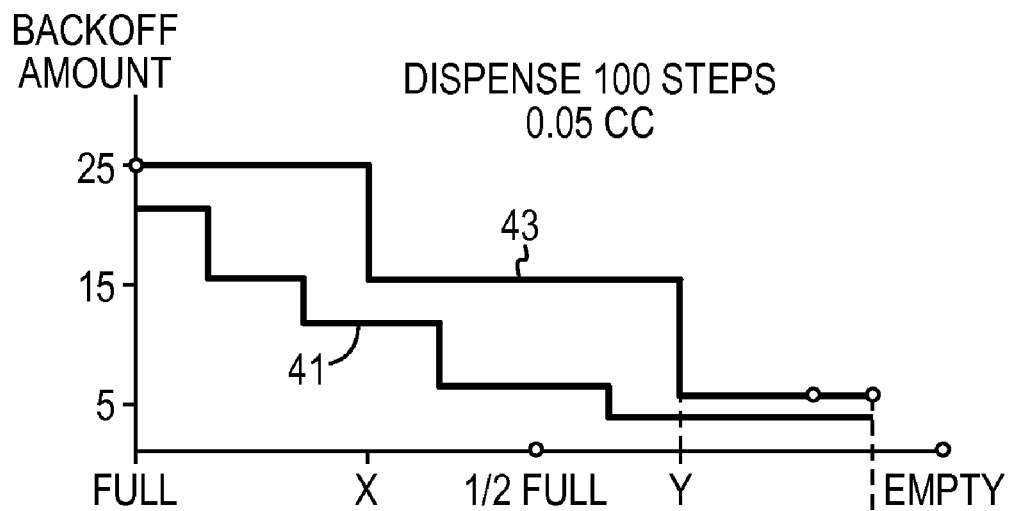

FIG. 2B illustrates the above example. In each case the amount dispensed will be 0.05 cc's by a net forward motion of the piston by 100 steps. When the piston is at location X, the backoff is reduced to 15 steps and at location Y the backoff is reduced to 5 steps.

Figure 2C:
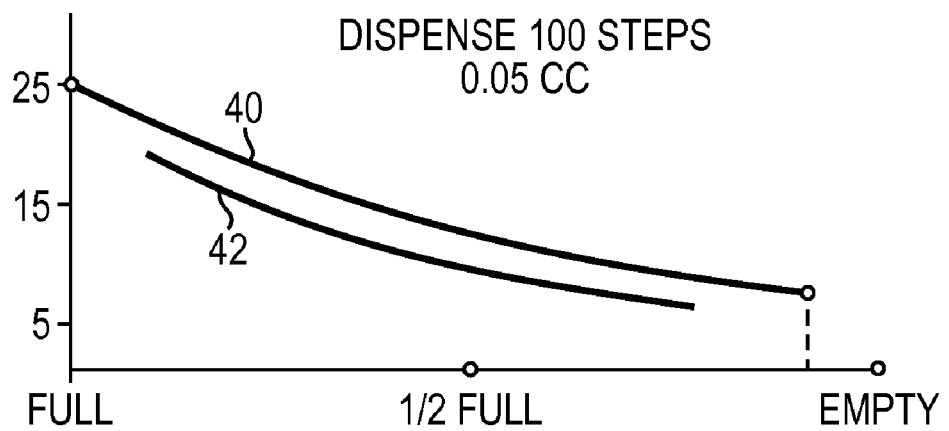

FIG. 2C illustrates a profile 40 where, for an equal amount dispensed each time, the backoff may be continuously changed as the volume of fluid in the syringe is reduced.

Note, the above numbers for FIGS. 2A, B and C are for an illustrative volume of an illustrative fluid dispensed in each case. When the fluid type is changed, the numbers and the profiles may all change, and when the dispensed amount changes the numbers and profiles may again change. In each case the numbers may be determined heuristically for each fluid type, for each amount dispensed and for the contents remaining in the syringe.

In FIGS. 2A, 2B, and 2C a particular amount (0.05 cc) of a fluid is dispensed by driving a stepping motor 100 steps in each example. But other amounts may be dispensed and a family of backoff profiles may be generated. Referring to FIGS. 2B and 2C, if only 0.025 cc of fluid is dispensed, either the step profile 41 or the continuous profile 42 may apply.

In some applications the amount dispensed may be different for each successive dispensing. For example, if a series of dots were dispensed having the following sizes: 0.05 cc; 0.025 cc; 0.05 cc; etc., the backoff for each dispensing would alternate between traces 43 and 41 in FIG. 2B and between 40 and 42 in FIG. 2C. Thus, differing amounts may be dispensed in sequential steps, where different profiles from the family of profiles are implemented to determine the backoff number of steps for each dot dispensed. In that case the controller will select the applicable backoff profile that applies for each particular dot being dispensed from the profile families.

The backoff amount may be kept in a table or a profile in the controller memory and referenced each time a dot is dispensed. The table or profile illustratively will be specific to the fluid type (its characteristics), the amount of fluid remaining (the position of the piston) in the syringe, and the amount to be dispensed.

Figure 3:
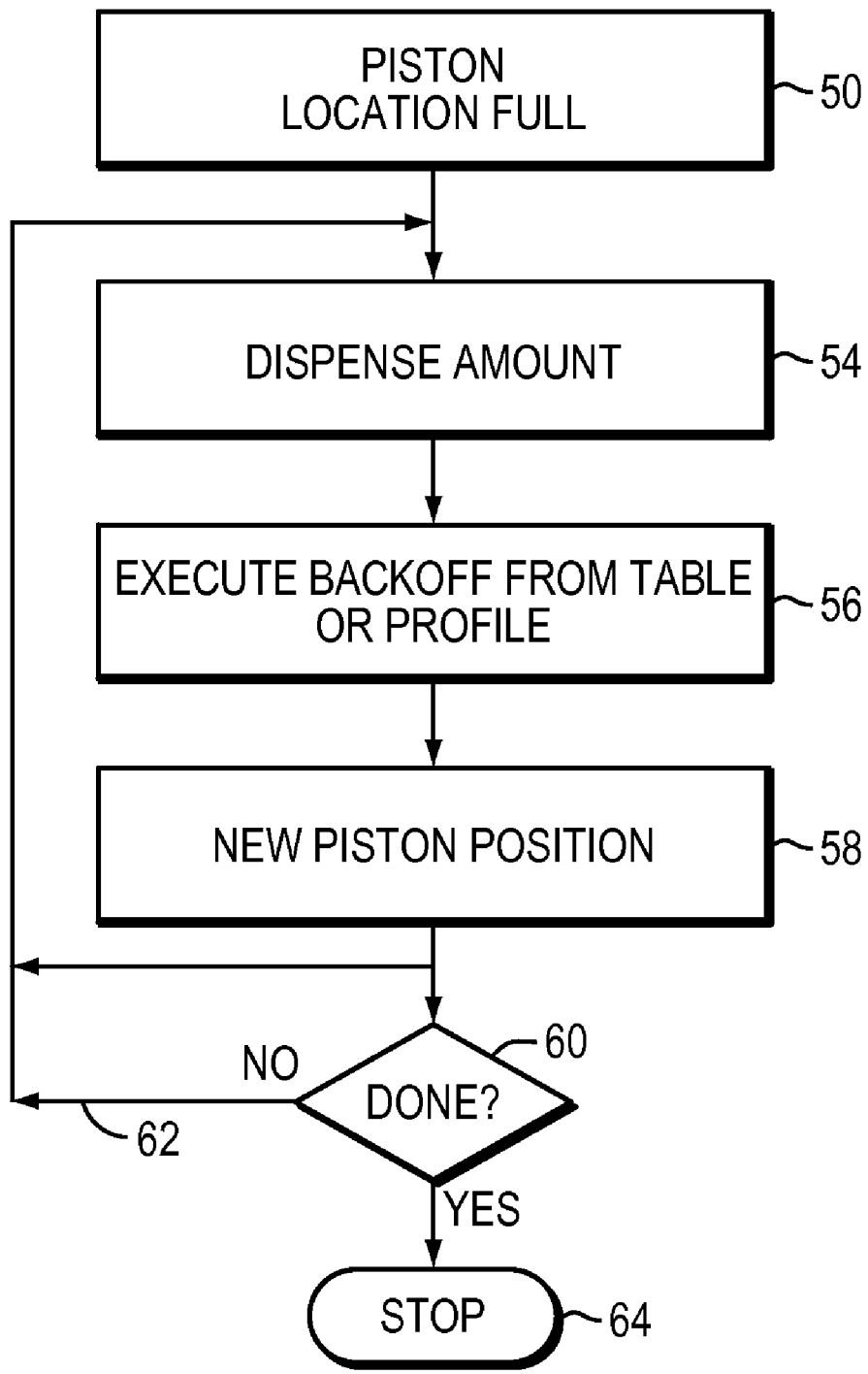
FIG. 3 is a flow chart of the dispensing operation.

FIG. 3 is an illustrative flow chart of the dispensing process. With the syringe full 50, a given dot size (or volume) is requested from the dispenser. The controller converts the dot size to a number of forward stepping motor steps and sends that amount plus a backoff amount to the dispensing unit. The piston moves 54 the required number of steps and the controller commands the stepping motor to move backward the number of backoff steps 56. The stepping motor complies. There may be a timing lag before the stepping motor is commanded to move backward. Any timing lag may be determined heuristically for each application.

Referring to FIGS. 2A and 3, if the process of FIG. 3 implements the step sequence of FIG. 2A, it does so automatically. That is, once the number of dispensing steps and backoff steps are known for each location of the syringe plunger 32, the operation will run automatically. With the plunger at location A and another dispensing is needed, the processor will load the 125 steps and 25 step backoff, whereupon the motor drive will follow the instructions finally locating the plunger at point C. Once at location C, the processor may automatically load the 125 steps and the 25 step backoff for driving the plunger to location D and then to location E. Once at location E and another dispensing is needed, the processor will automatically load the 115 steps and the 15 step backoff, and the motor will drive the plunger to location I. Of note is the operation occurs automatically, and will do so following the dispensing profile that has been predetermined.

When the piston comes to rest at a new position 58, it may be near enough to the end of its travel that no more fluid may be dispensed. If done 60, the operation stops 64. If not 62, the dispensing may continue at 54.

It should be understood that the above-described embodiments are being presented herein as examples and that many variations and alternatives thereof are possible. Accordingly, the present invention should be viewed broadly as being defined only as set forth in the hereinafter appended claims.

What is claimed is:

1. A fluid dispenser comprising:
a reservoir holding the fluid;
a piston arranged to drive the fluid;
an aperture from which the driven fluid is dispensed;
a motor with a coupling to the piston, wherein the motor drives the piston both forward and backward;
wherein the distance the piston is driven forward determines the amount of fluid dispensed and thus the amount of fluid remaining in the reservoir, and the distance the piston is driven backward determines a backoff distance, wherein the backoff distance is selected to inhibit the fluid from leaking while holding the fluid at a repeatable location at or near the aperture;
a computer processor, and memory that holds a series of tables that relate the backoff distance to both the volume to be dispensed and the amount of fluid remaining to be dispensed, wherein there are separate tables for each fluid to be dispensed;
wherein when a computer program is executed by the processor, the processor accesses the table for the fluid being dispensed, and based on the given volume to be dispensed and the amount of fluid remaining to be dispensed the processor retrieves the corresponding backoff distance; and
wherein the computer processor then drives the motor forward to dispense the given volume of fluid and then drives the motor backward the retrieved backoff distance.

2. The fluid dispenser of claim 1 wherein the computer processor automatically loads the next volume of fluid to be dispensed and then finds the corresponding backoff distance from the accessed table.

3. The fluid dispenser of claim 1 wherein the reservoir comprises a syringe, the aperture is defined by a needle with an opening, and wherein the repeatable location is at the aperture.

4. The fluid dispenser of claim 1 wherein the motor is a stepping motor, the number of steps that the motor is driven forward determines the amount of fluid that is dispensed, and the number of steps the motor is driven backward determines the backoff distance.

5. The fluid dispenser of claim 1 wherein the backoff distances in the tables is the same for more than one amount of fluid remaining to be dispensed.

6. The fluid dispenser of claim 5 wherein the backoff distance has one value for a first range of amounts of fluid remaining to be dispensed, and has different values for each of a plurality of different ranges of amounts of fluid remaining to be dispensed.

7. The fluid dispenser of claim 5 wherein the backoff distance is different for at least some of the amounts of fluid remaining to be dispensed.

8. A fluid dispenser comprising:
a syringe holding the fluid and a needle coupled to the syringe and defining an outlet;
a piston arranged to drive the fluid from the syringe through the outlet of the needle;
a motor with a coupling to the piston, wherein the motor drives the piston both forward and backward;
wherein the distance the piston is driven forward determines the amount of fluid dispensed and thus the amount of fluid remaining in the syringe, and the distance the piston is driven backward determines a backoff distance, wherein the backoff distance is selected to inhibit the fluid from leaking while holding the fluid at a repeatable location at or near the outlet of the needle;
a computer processor, and memory that holds a series of tables that relate the backoff distance to both the volume to be dispensed and the amount of fluid remaining to be dispensed, wherein there are separate tables for each fluid to be dispensed;
wherein when a computer program is executed by the processor, the processor accesses the table for the fluid being dispensed, and based on the given volume to be dispensed and the amount of fluid remaining to be dispensed the processor retrieves the corresponding backoff distance, wherein the computer processor automatically loads the next volume of fluid to be dispensed and then finds the corresponding backoff distance from the accessed table;
wherein the computer processor then drives the motor forward to dispense the given volume of fluid and then drives the motor backward the retrieved backoff distance, wherein the backoff distances in the tables is the same for more than one amount of fluid remaining to be dispensed, wherein the backoff distance has one value for a first range of amounts of fluid remaining to be dispensed, and has different values for each of a plurality of different ranges of amounts of fluid remaining to be dispensed, and wherein the backoff distance is different for at least some of the amounts of fluid remaining to be dispensed;
wherein the motor is a stepping motor, the number of steps that the motor is driven forward determines the amount of fluid that is dispensed, and the number of steps the motor is driven backward determines the backoff distance.

9. A method for dispensing a fluid from a reservoir using a piston arranged to drive the fluid, an aperture from which the driven fluid is dispensed, and a motor with a coupling to the piston, wherein the motor drives the piston both forward and backward, wherein the distance the piston is driven forward determines the amount of fluid dispensed and thus the amount of fluid remaining in the reservoir, and the distance the piston is driven backward determines a backoff distance, wherein the backoff distance is selected to inhibit the fluid from leaking while holding the fluid at a repeatable location at or near the aperture, the method comprising the steps of:
providing a computer processor;
providing computer memory associated with the processor and that holds a series of tables that relate the backoff distance to both the volume to be dispensed and the amount of fluid remaining to be dispensed, wherein there are separate tables for each fluid to be dispensed;
using the processor to execute a computer program, wherein the processor accesses the table for the fluid being dispensed and based on the given volume to be dispensed and the amount of fluid remaining to be dispensed the processor retrieves the corresponding backoff distance; and using the computer processor to drive the motor forward to dispense the given volume of fluid and then drive the motor backward the retrieved backoff distance.

10. The method of claim 9 wherein the computer processor automatically loads the next volume of fluid to be dispensed and then finds the corresponding backoff distance from the accessed table.

11. The method of claim 9 wherein the reservoir comprises a syringe, the aperture is defined by a needle with an opening, and wherein the repeatable location is at the aperture.

12. The method of claim 9 wherein the motor is a stepping motor, the number of steps that the motor is driven forward determines the amount of fluid that is dispensed, and the number of steps the motor is driven backward determines the backoff distance.

13. The method of claim 9 wherein the backoff distances in the tables is the same for more than one amount of fluid remaining to be dispensed.

14. The method of claim 13 wherein the backoff distance has one value for a first range of amounts of fluid remaining to be dispensed, and has different values for each of a plurality of different ranges of amounts of fluid remaining to be dispensed.

15. The method of claim 14 wherein the backoff distance is different for at least some of the amounts of fluid remaining to be dispensed.

* * * * *